US012810477B2

(12) United States Patent
Kohara et al.

(10) Patent No.: US 12,810,477 B2
(45) Date of Patent: Nov. 24, 2026

(54) IMAGE PROCESSING SYSTEM, IMAGE PROCESSING DEVICE, IMAGE PROCESSING METHOD, AND STORAGE MEDIUM INCLUDING IMAGE PROCESSING PROGRAM

(71) Applicants: DENSO CORPORATION, Kariya-city (JP); TOYOTA JIDOSHA KABUSHIKI KAISHA, Toyota (JP)

(72) Inventors: Kenji Kohara, Tokyo (JP); Masashi Yamazaki, Miyoshi (JP); Kohei Maejima, Nagakute (JP); Yuki Yamamoto, Toyota (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 147 days.

(21) Appl. No.: 18/980,416

(22) Filed: Dec. 13, 2024

(65) Prior Publication Data

US 2025/0111539 A1 Apr. 3, 2025

Related U.S. Application Data

(63) Continuation of application No. PCT/JP2023/018856, filed on May 22, 2023.

(30) Foreign Application Priority Data

Jun. 17, 2022 (JP) ................................ 2022-098442

(51) Int. Cl.

*G06T 7/00* (2017.01)
*B60R 1/24* (2022.01)

(52) U.S. Cl.

CPC .................. *G06T 7/97* (2017.01); *B60R 1/24* (2022.01); *G06T 2207/20212* (2013.01); *G06T 2207/30252* (2013.01)

(58) Field of Classification Search

CPC ............ G06T 7/97; G06T 2207/20212; G06T 2207/30252; G06T 3/08; G06T 3/4038;

(Continued)

(56) References Cited

U.S. PATENT DOCUMENTS

2013/0141547 A1 6/2013 Shimizu
2015/0178884 A1* 6/2015 Scholl ...................... B60R 1/27 382/104

(Continued)

*Primary Examiner* — Stephen P Coleman
(74) *Attorney, Agent, or Firm* — Precision Patents, P.C.

(57) ABSTRACT

An image processing system includes a processor configured to acquire a first image by a first external camera and a second image by a second external camera, convert the first image and the second image into a first viewpoint image and a second viewpoint image from a specific virtual viewpoint, and generate a composite image by synthesizing the first viewpoint image and the second viewpoint image. The composite image has an imaged ground surface that curves to have a horizon convex upward. A first position on an imaged ground surface of the first viewpoint image and a second position on an imaged ground surface of the second viewpoint image are aligned with each other, and the first position and the second position represent the same position in an actual ground surface. An object extends across the horizon in the composite image has a smoothly curved outline across the horizon.

14 Claims, 6 Drawing Sheets

(58) Field of Classification Search

CPC .. G06T 1/00; G06T 19/00; B60R 1/24; B60R 1/00; B60R 1/27; B60R 1/20; B60R 1/23; H04N 7/18

USPC .......................................................... 382/100

See application file for complete search history.

(56) References Cited

U.S. PATENT DOCUMENTS

| | | | |
|---|---|---|---|
| 2021/0300435 | A1 | 9/2021 | Kondo et al. |
| 2021/0304127 | A1 | 9/2021 | Yamamoto et al. |

* cited by examiner

IMAGE PROCESSING SYSTEM, IMAGE PROCESSING DEVICE, IMAGE PROCESSING METHOD, AND STORAGE MEDIUM INCLUDING IMAGE PROCESSING PROGRAM

CROSS REFERENCE TO RELATED APPLICATION

The present application is a continuation application of International Patent Application No. PCT/JP2023/018856 filed on May 22, 2023, which designated the U.S. and claims the benefit of priority from Japanese Patent Application No. 2022-098442 filed on Jun. 17, 2022. The entire disclosures of all of the above applications are incorporated herein by reference.

TECHNICAL FIELD

This disclosure relates to image processing technology for processing images captured by external cameras mounted on a host mobile body.

BACKGROUND

There is a technique for generating a 360-degree image viewed from a virtual viewpoint by combining images captured by multiple cameras installed on a vehicle.

SUMMARY

According to a first aspect of the present disclosure, an image processing system is provided. The image processing system includes a processor configured to cause the image processing system to perform acquiring a first image captured by a first external camera mounted on a host mobile body and a second image captured by a second external camera mounted on the host mobile body. An imaging range of the first image and an imaging range of the second image have an overlapped part. The processor is further configured to cause the image processing system to perform converting the first image and the second image respectively into a first viewpoint image and a second viewpoint image that are viewed from a specific virtual viewpoint, and generating a composite image by synthesizing the first viewpoint image and the second viewpoint image. As a result, an imaged ground surface in the composite image curves upward to have a horizon that is convex, and a first position on an imaged ground surface in the overlapped part of the first viewpoint image and a second position on an imaged ground surface in the overlapped part of the second viewpoint image are aligned with each other in the composite image. The first position and the second position represent the same position in an actual ground surface. The generating of the composite image includes generating the composite image including an object that has an outline smoothly curved across the horizon based on at least one of the first viewpoint image and the second viewpoint image including the object extending across the horizon.

According to a second aspect of the present disclosure, an image processing device is provided. The image processing device includes a processor configured to cause the image processing device to perform acquiring a first image captured by a first external camera mounted on a host mobile body and a second image captured by a second external camera mounted on the host mobile body. An imaging range of the first image and an imaging range of the second image have an overlapped part. The processor is configured to cause the image processing device to perform converting the first image and the second image respectively into a first viewpoint image and a second viewpoint image that are viewed from a specific virtual viewpoint, and generating a composite image by synthesizing the first viewpoint image and the second viewpoint image. As a result, an imaged ground surface in the composite image curves upward to have a horizon that is convex, and a first position on an imaged ground surface in the overlapped part of the first viewpoint image and a second position on an imaged ground surface in the overlapped part of the second viewpoint image are aligned with each other in the composite image. The first position and the second position represent the same position in an actual ground surface. The generating of the composite image includes generating the composite image including an object that has an outline smoothly curved across the horizon based on at least one of the first viewpoint image and the second viewpoint image including the object extending across the horizon.

According to a third aspect of the present disclosure, an image processing method executed by a processor for processing a first image captured by a first external camera and a second image captured by a second external camera is provided. The first external camera and the second external camera are mounted on a host mobile body. The image processing method includes acquiring the first image captured by the first external camera and the second image captured by the second external camera. An imaging range of the first image and an imaging range of the second image have an overlapped part. The image processing method further includes converting the first image and the second image respectively into a first viewpoint image and a second viewpoint image that are viewed from a specific virtual viewpoint, and generating a composite image by synthesizing the first viewpoint image and the second viewpoint image. As a result, an imaged ground surface in the composite image curves upward to have a horizon that is convex, and a first position on an imaged ground surface in the overlapped part of the first viewpoint image and a second position on an imaged ground surface in the overlapped part of the second viewpoint image are aligned with each other in the composite image. The first position and the second position represent the same position in an actual ground surface. The generating of the composite image includes generating the composite image including an object that has an outline smoothly curved across the horizon based on at least one of the first viewpoint image and the second viewpoint image including the object extending across the horizon.

According to a fourth aspect of the present disclosure, a non-transitory computer readable storage medium including an image processing program is provided. The image processing program is configured to, when executed by a processor, cause the processor to perform acquiring a first image captured by a first external camera mounted on a host mobile body and a second image captured by a second external camera mounted on the host mobile body. An imaging range of the first image and an imaging range of the second image have an overlapped part. The image processing program is configured to cause the processor to perform converting the first image and the second image respectively into a first viewpoint image and a second viewpoint image that are viewed from a specific virtual viewpoint, and generating a composite image by synthesizing the first viewpoint image and the second viewpoint image. As a result, an imaged ground surface in the composite image curves upward to have a horizon that is convex, and a first position on an imaged ground surface in the overlapped part of the first viewpoint image and a second position on an imaged ground surface in the overlapped part of the second viewpoint image are aligned with each other in the composite image. The first position and the second position represent the same position in an actual ground surface. The generating of the composite image includes generating the composite image including an object that has an outline smoothly curved across the horizon based on at least one of the first viewpoint image and the second viewpoint image including the object extending across the horizon.

DETAILED DESCRIPTION OF THE PREFERRED EMBODIMENTS

Figure 1:
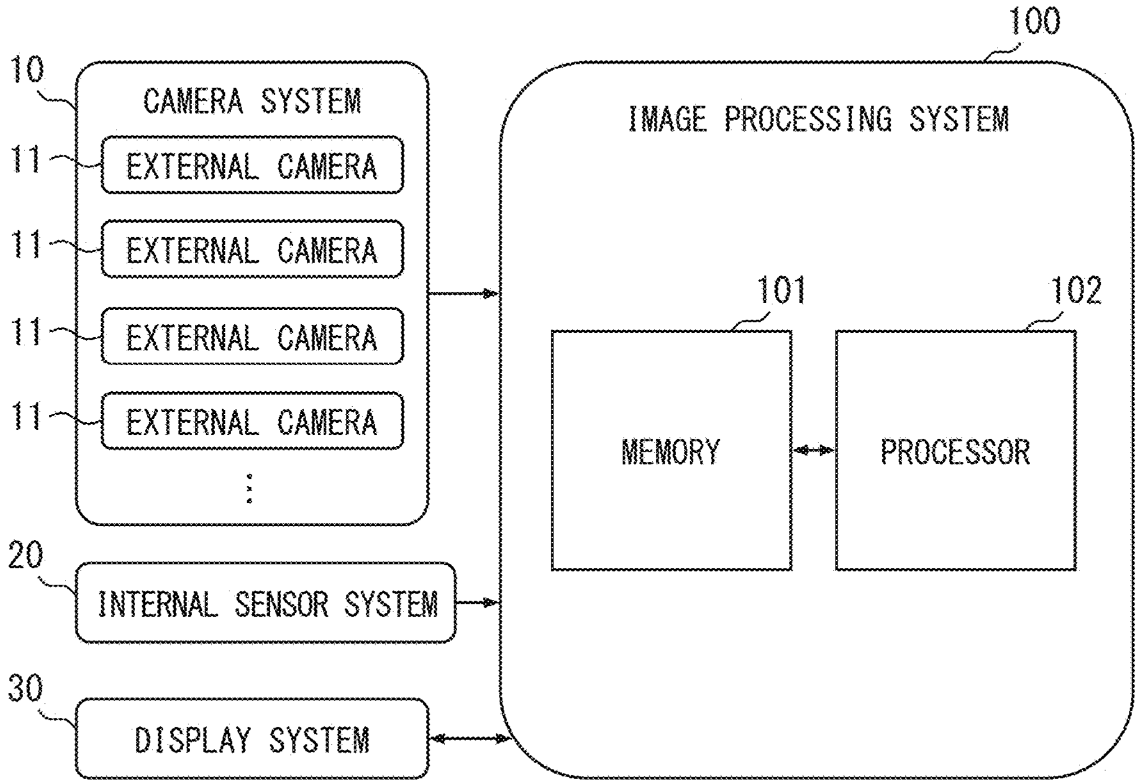
FIG. 1 is a block diagram illustrating an overall configuration according to a first embodiment.

To begin with, examples of relevant techniques will be described.

There is a technique for generating a 360-degree image viewed from a virtual viewpoint by combining images captured by multiple cameras installed on a vehicle. In this technique, a virtual projection surface is defined which has a hemisphere surface and a flat bottom surface. The position of each pixel of the images below the horizon is identified on the flat bottom surface and the position of each pixel of the images above the horizon is identified on the hemisphere surface. The position of each pixel of the images is determined from the installation position and angle of the cameras. In the technique, the identified position of each pixel of the images on the virtual projection surface is further identified on a three-dimensional projection surface having a three-dimensional shape centered on the position of the vehicle. Then, the identified position of each pixel of the images on the three-dimensional projection surface is further identified on a display image frame based on a predetermined viewpoint position, and the value of each pixel of the images are drawn at the identified position on the display image frame. Thus, the technique reduces the effect of parallax between the camera images using the virtual projection surface.

In such a technique, the virtual projection surface is defined by the flat bottom surface and the hemisphere surface. In this case, the composite image appears bent at the horizon where the hemisphere surface rises from the flat bottom surface.

It is an objective of the present disclosure to provide an image processing system that can avoid a composite image from appearing bent while reducing the effects of parallax between captured images. It is another objective of the present disclosure to provide an image processing device that can avoid a composite image from appearing bent while reducing the effects of parallax between captured images. It is another objective of the present disclosure to provide an image processing method that can avoid a composite image from appearing bent while reducing the effect of parallax between captured images. It is another objective of the present disclosure to provide a non-transitory storage medium including an image processing program that can avoid a composite image from appearing bent while reducing the effects of parallax between captured images.

Hereinafter, a technical solution of the present disclosure to address the above described objectives will be described.

According to a first aspect of the present disclosure, an image processing system is provided. The image processing system includes a processor configured to cause the image processing system to perform acquiring a first image captured by a first external camera mounted on a host mobile body and a second image captured by a second external camera mounted on the host mobile body. An imaging range of the first image and an imaging range of the second image have an overlapped part. The processor is further configured to cause the image processing system to perform converting the first image and the second image respectively into a first viewpoint image and a second viewpoint image that are viewed from a specific virtual viewpoint, and generating a composite image by synthesizing the first viewpoint image and the second viewpoint image. As a result, an imaged ground surface in the composite image curves upward to have a horizon that is convex, and a first position on an imaged ground surface in the overlapped part of the first viewpoint image and a second position on an imaged ground surface in the overlapped part of the second viewpoint image are aligned with each other in the composite image. The first position and the second position represent the same position in an actual ground surface. The generating of the composite image includes generating the composite image including an object that has an outline smoothly curved across the horizon based on at least one of the first viewpoint image and the second viewpoint image including the object extending across the horizon.

According to a second aspect of the present disclosure, an image processing device is provided. The image processing device includes a processor configured to cause the image processing device to perform acquiring a first image captured by a first external camera mounted on a host mobile body and a second image captured by a second external camera mounted on the host mobile body. An imaging range of the first image and an imaging range of the second image have an overlapped part. The processor is configured to cause the image processing device to perform converting the first image and the second image respectively into a first viewpoint image and a second viewpoint image that are viewed from a specific virtual viewpoint, and generating a composite image by synthesizing the first viewpoint image and the second viewpoint image. As a result, an imaged ground surface in the composite image curves upward to have a horizon that is convex, and a first position on an imaged ground surface in the overlapped part of the first viewpoint image and a second position on an imaged ground surface in the overlapped part of the second viewpoint image are aligned with each other in the composite image. The first position and the second position represent the same position in an actual ground surface. The generating of the composite image includes generating the composite image including an object that has an outline smoothly curved across the horizon based on at least one of the first viewpoint image and the second viewpoint image including the object extending across the horizon.

According to a third aspect of the present disclosure, an image processing method executed by a processor for processing a first image captured by a first external camera and a second image captured by a second external camera is provided. The first external camera and the second external camera are mounted on a host mobile body. The image processing method includes acquiring the first image captured by the first external camera and the second image captured by the second external camera. An imaging range of the first image and an imaging range of the second image have an overlapped part. The image processing method further includes converting the first image and the second image respectively into a first viewpoint image and a second viewpoint image that are viewed from a specific virtual viewpoint, and generating a composite image by synthesizing the first viewpoint image and the second viewpoint image. As a result, an imaged ground surface in the composite image curves upward to have a horizon that is convex, and a first position on an imaged ground surface in the overlapped part of the first viewpoint image and a second position on an imaged ground surface in the overlapped part of the second viewpoint image are aligned with each other in the composite image. The first position and the second position represent the same position in an actual ground surface. The generating of the composite image includes generating the composite image including an object that has an outline smoothly curved across the horizon based on at least one of the first viewpoint image and the second viewpoint image including the object extending across the horizon.

According to a fourth aspect of the present disclosure, a non-transitory computer readable storage medium including an image processing program is provided. The image processing program is configured to, when executed by a processor, cause the processor to perform acquiring a first image captured by a first external camera mounted on a host mobile body and a second image captured by a second external camera mounted on the host mobile body. An imaging range of the first image and an imaging range of the second image have an overlapped part. The image processing program is configured to cause the processor to perform converting the first image and the second image respectively into a first viewpoint image and a second viewpoint image that are viewed from a specific virtual viewpoint, and generating a composite image by synthesizing the first viewpoint image and the second viewpoint image. As a result, an imaged ground surface in the composite image curves upward to have a horizon that is convex, and a first position on an imaged ground surface in the overlapped part of the first viewpoint image and a second position on an imaged ground surface in the overlapped part of the second viewpoint image are aligned with each other in the composite image. The first position and the second position represent the same position in an actual ground surface. The generating of the composite image includes generating the composite image including an object that has an outline smoothly curved across the horizon based on at least one of the first viewpoint image and the second viewpoint image including the object extending across the horizon.

According to the first to fourth aspects, the composite image is generated using the outside virtual projection surface and the inside virtual projection surface. Thus, in the composite image, the imaged ground surface curves, an object appears smoothly curved across the horizon, and the imaged ground surface is represented as a single surface inside the outside virtual projection surface. In other words, the projection onto the outside virtual projection surface reduces the effect of parallax between images, resulting in a single representation of the ground surface inside the outside virtual projection surface. In addition, the outside virtual projection surface rises smoothly, so that bending of the image can also be avoided. Thus, image bending can be avoided while reducing the effects of parallax between images.

Hereinafter, embodiments of the present disclosure will be described with reference to the drawings. It should be noted that the same reference numerals are assigned to corresponding components in the respective embodiments, and overlapping descriptions may be omitted. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular.

Figure 3:
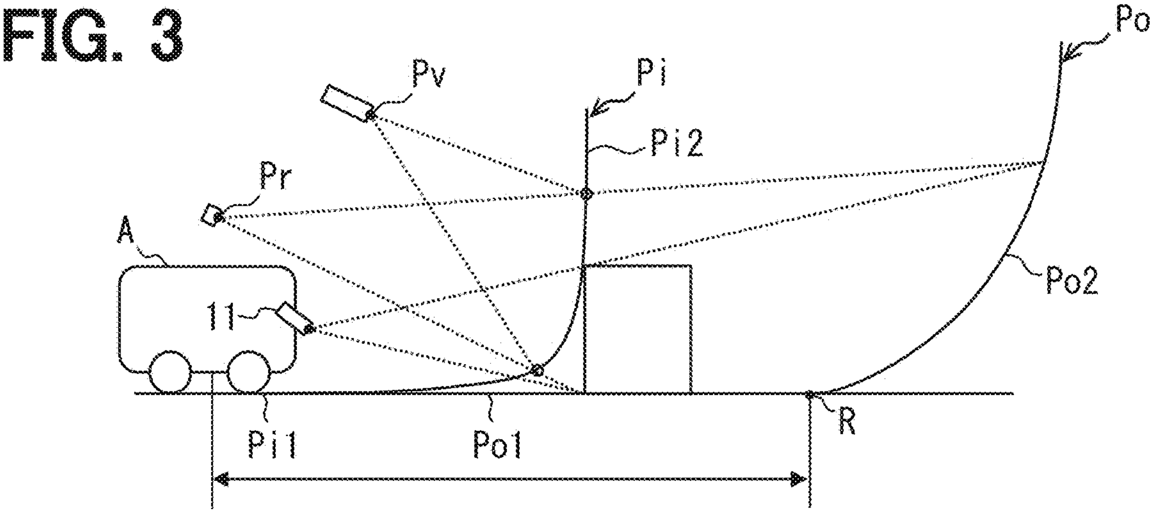
FIG. 3 is a diagram illustrating a positional relationship of an outside virtual projection surface and an inside virtual projection surface.

(First Embodiment) An image processing system 100 of the first embodiment shown in FIG. 1 processes images captured by external cameras 11 of a host vehicle A as a host mobile body shown in FIG. 3. From a viewpoint of the host vehicle A, the host vehicle A may also be defined as an own vehicle (i.e., an ego-vehicle). The host vehicle A is a mobile body, such as an automobile, that can drive on a driving path with an occupant on board.

The host vehicle A is capable of executing an autonomous driving mode, which is classified into levels according to the degree of manual operation by the occupant in a dynamic driving task. The autonomous driving mode may be achieved with automated driving control, such as conditional driving automation, advanced driving automation, or full driving automation, where the system in operation performs all dynamic driving tasks. The autonomous driving mode may be achieved with an advanced driving assistance control, such as driving assistance or partial driving automation, where an occupant performs partial or all of the dynamic driving tasks. The autonomous driving mode may be realized by either one or a combination of the automated driving control and the advanced driving assistance control. The autonomous driving mode may be realized by switching between the automated driving control and the advanced driving assistance control.

Figure 2:
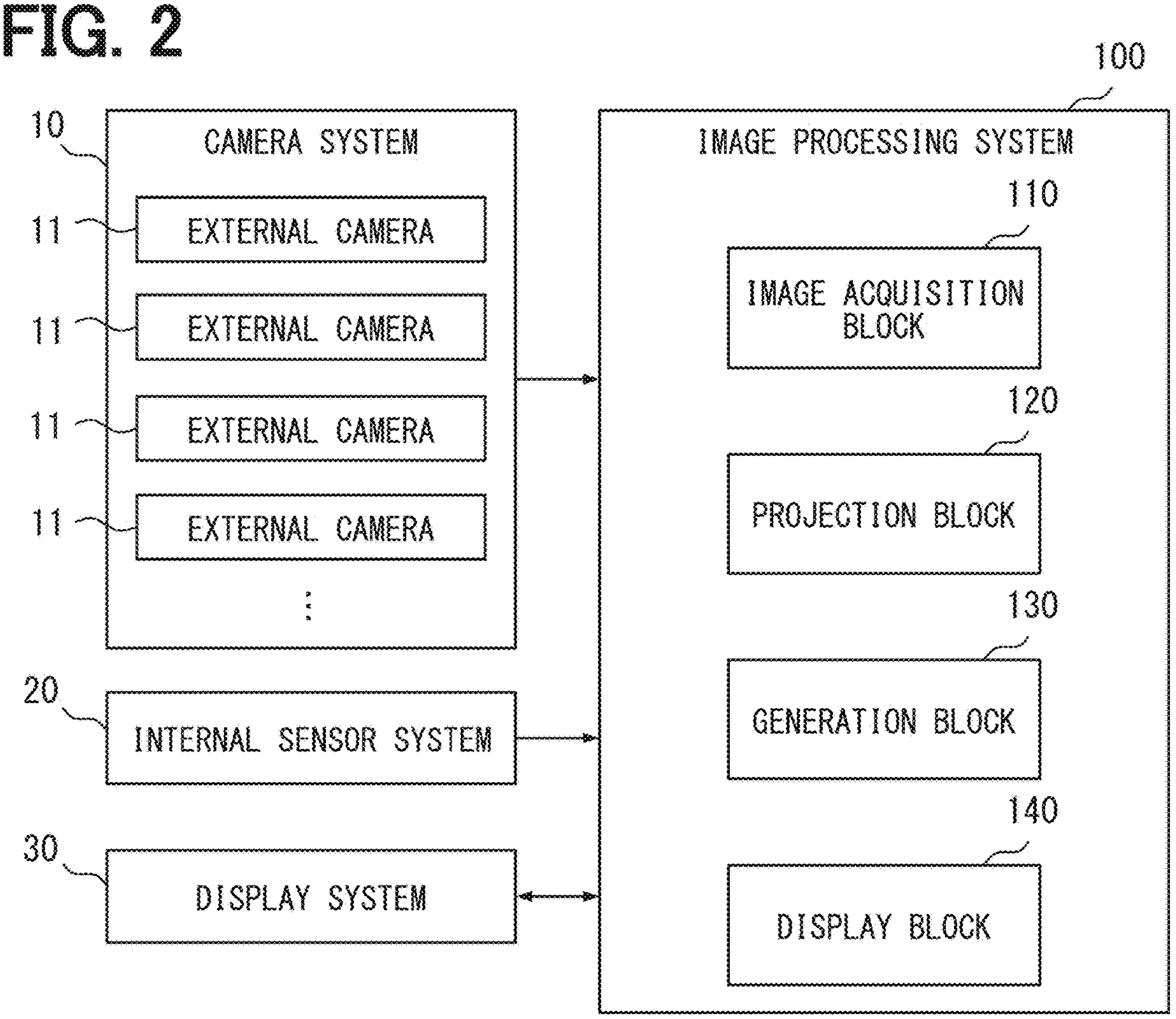
FIG. 2 is a block diagram illustrating a functional configuration of an image processing system according to the first embodiment.

The host vehicle A is equipped with a camera system 10, an internal sensor system 20, and a display system 30 shown in FIGS. 1 and 2. The camera system 10 is configured to acquire camera information for the external environment and the internal environment of the host vehicle A that can be used by the image processing system 100. The camera system 10 includes multiple external cameras 11.

Each of the external cameras 11 acquires image data of the external environment by capturing images of the external environment of the host vehicle A in a predetermined range (i.e., an imaging range). Each of the external cameras 11, for example, has a light-receiving unit and a control unit. The light-receiving unit has a light-receiving lens and a light-receiving element. The light-receiving unit collects incident light from the imaging range with, for example, a light-receiving lens, and directs the collected incident light to the light-receiving element, such as a CCD sensor or CMOS sensor. The light-receiving element has an array of multiple light-receiving pixels aligned in a two-dimensional direction. The control unit is configured to control the light-receiving unit. The control unit is mainly composed of a processor in the broad sense, such as a microcontroller or FPGA. The control unit has an image capturing function. The image capturing function is a function for capturing a color image as described above. The control unit senses and measures the intensity of the incident light by reading out the voltage values based on the incident light received by each light-receiving pixel using, for example, a global shutter system, at a timing based on the operating clock of the clock oscillator in each of the external cameras 11. The control unit can generate image data in which the intensity of incident light is associated with two-dimensional coordinates on the image plane corresponding to the imaging range. Such image data is output sequentially to the image processing system 100.

The external cameras 11 are installed such that imaging ranges of adjacent ones of the external cameras 11 have an overlapped part.

The host vehicle A may be equipped with an external sensor other than the external cameras 11 to detect objects in the external environment of the host vehicle A. The external sensor other than the external cameras 11 may be at least one of a Light Detection and Ranging/Laser Imaging Detection and Ranging (LIDAR), a radar, and a sonar.

The internal sensor system 20 acquires, as internal environment information, sensor information from the internal environment of the host vehicle A. The internal sensor system 20 detects certain kinematic physical quantities in the internal environment of the host vehicle A. The internal sensor system 20 may include at least one of a driving speed sensor, an acceleration sensor, and a gyro sensor.

The display system 30 presents visual information to the occupant in the host vehicle A. The display system 30 may include at least one of a head-up display (HUD), a multi-function display (MFD), a combination meter, a navigation unit, and a light-emitting unit.

The image processing system 100 is connected to the camera system 10, the internal sensor system 20, and the display system 30 via at least one of Local Area Network (LAN) lines, wire harnesses, internal buses, and wireless communication lines. The image processing system 100 includes at least one dedicated computer.

The dedicated computer constituting the image processing system 100 may be a human machine interface (HMI) control unit (HCU) that controls information presentation in the display system 30 in the host vehicle A. The dedicated computer constituting the image processing system 100 may be a drive control Electronic Control Unit (ECU) that controls the driving operation of the host vehicle A. The dedicated computer constituting the image processing system 100 may be a navigation ECU that navigates a travel route of the host vehicle A. The dedicated computer constituting the image processing system 100 may be a locator ECU that estimates the self-state quantity of the host vehicle A. The dedicated computer constituting the image processing system 100 may be an actuator ECU that controls driving actuators of the host vehicle A. The dedicated computer constituting the image processing system 100 may be a computer outside the host vehicle A, for example, constituting an external center or mobile terminal that can communicate with the host vehicle A.

The dedicated computer constituting the image processing system 100 may be an integrated Electronic Control Unit (ECU) that integrally controls the driving of the host vehicle A. The dedicated computer constituting the image processing system 100 may be a determination ECU that determines driving tasks in the driving control of the host vehicle A. The dedicated computer constituting the image processing system 100 may be a monitoring ECU that monitors the driving control of the host vehicle A. The dedicated computer constituting the image processing system 100 may be an evaluation ECU that evaluates the driving control of the host vehicle A.

The dedicated computer constituting the image processing system 100 includes at least one memory 101 and at least one processor 102. The memory 101 is at least one type of non-transitory tangible storage medium that stores computer-readable programs and data in a non-transitory manner, such as a semiconductor memory, a magnetic medium, and an optical medium. Here, the memory 101 may accumulate and retain data even when the host vehicle A is turned off, or may temporarily store data, deleting the data when the host vehicle A is turned off. The processor 102 includes, as a processing core, at least one type of a Central Processing Unit (CPU), a Graphics Processing Unit (GPU), a Reduced Instruction Set Computer (RISC)-CPU, a Data Flow Processor (DFP), and a Graph Streaming Processor (GSP).

In the image processing system 100, the processor 102 executes instructions contained in an image processing program stored in the memory 101 for processing images captured by the exterior cameras 11 in the host vehicle A. The image processing system 100 builds functional blocks for processing images captured by the exterior cameras 11 in the host vehicle A. The functional blocks built in the image processing system 100 include an image acquisition block 110, a projection block 120, a generation block 130, and a display block 140, as shown in FIG. 2.

Figure 4:
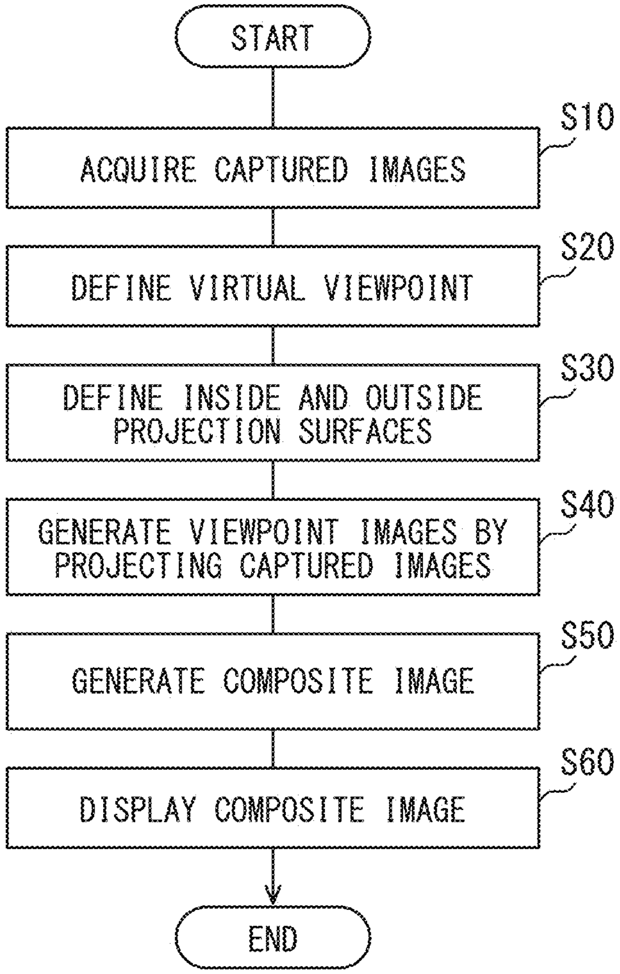
FIG. 4 is a flowchart depicting an image processing procedure according to the first embodiment.

The image processing method, in which the image processing system 100 processes the images captured by the exterior cameras 11 in the host vehicle A, is performed according to the image processing procedure shown in FIG. 4, with these blocks 110, 120, 130, and 140 working together.

This image processing procedure is repeatedly executed in a scene where image data from the external cameras 11 is displayed to the occupant during the on-state of the host vehicle A (referred to as an external field display scene). The external field display scene may be a parking scene in which the host vehicle A is parked in a parking space. The external field display scene may be determined by the host vehicle A or an external center based on sensor information. Alternatively, the external field display scene may be determined based on an operation of in-vehicle equipment by the occupant as a trigger. Each "S" in this image processing flow means a step executed based on instructions included in the image processing program.

First, in S10, the image acquisition block 110 acquires images captured by the external cameras 11 in the camera system 10.

Next, in S20, the projection block 120 defines a virtual viewpoint Pv for creating a composite image described below (see FIG. 3). The virtual viewpoint Pv is the viewpoint that determines the appearance of the composite image. In other words, the composite image is created by converting the captured images into viewpoint images viewed from the virtual viewpoint Vp and synthesizing the viewpoint images.

In the following S30, the projection block 120 defines an inside virtual projection surface Pi and an outside virtual projection surface Po, as shown in FIG. 3. The projection block 120 defines the inside virtual projection surface Pi as a three-dimensional curved surface that approximates the ground plane around the host vehicle A and that increases in slope in a direction away from the host vehicle A. The projection block 120 defines the center of the inside virtual projection surface Pi as the location of the host vehicle A. The projection block 120 defines the shape of the inside virtual projection surface Pi in the form of a mathematical expression or polyhedral shape.

The projection block 120 defines the outside virtual projection surface Po as a shape having a flat surface Po1 that approximate the ground plane around the host vehicle A and an outside rising surface Po2 that rises from a predetermined rising start position R of the flat surface Po1. The projection block 120 defines the center of the outside projection surface Po as the location of the host vehicle A.

The flat surface Po1 in the outside virtual projection surface Po is defined as a plane that extends outward beyond the inside virtual projection surface Pi. In other words, the rising start position R of the outside virtual projection surface Po is set to a position outside the inside virtual projection surface Pi. That is, the rising start position R of the outside virtual projection surface Po is farther from the host vehicle A than the inside virtual projection surface Pi is. The distance from the center of the outside virtual projection surface Po to the rising start position R is large enough that the distance between the external cameras 11 can be considered an error, for example.

The outside rising surface Po2 in the outside virtual projection surface Po is defined as a curved surface that rises smoothly from the flat surface Po1. The outside rising surface Po2 is defined as a three-dimensional curved surface that increases in slope in a direction away from the host vehicle A. For example, the cross-section of the outside rising surface Po2 is defined by a quadratic function where the graph of the quadratic function opens up and has the vertex at the rising start position R. The cross-sectional shape of the graph may be a parabola or a circular arc.

Then, in S40, the projection block 120 executes a projection process of the acquired image data onto the inside virtual projection surface Pi using the outside virtual projection surface Po. Here, the projection process corresponds to determining the coordinate position on the inside virtual projection surface Pi corresponding to each pixel in the image data. The projection block 120 calculates a correspondence between each pixel of the images and the position of each pixel on the inside virtual projection surface Pi when viewed from the virtual viewpoint Pv.

The projection block 120 first projects the image data onto the outside virtual projection surface Po before projecting the image data onto the inside virtual projection surface Pi. For instance, the projection block 120 calculates the coordinate position of each pixel on the outside virtual projection surface Po in the vehicle coordinate system (referred to as an “outside corresponding position”), which corresponds to the coordinate position of each pixel in the image coordinate system, based on the stored installation positions and orientations of the external cameras 11 and the position and shape information of the outside virtual projection surface Po. The projection block 120 then further projects the image data projected onto the outside virtual projection surface Po onto the inside virtual projection surface Pi. For instance, the projection block 120 calculates the coordinate position of each pixel on the inside virtual projection surface Pi (referred to as an “inside corresponding position”) when viewed from the center point Pr of the inside virtual projection surface Pi, which corresponds to the outside virtual corresponding position, based on the position of the center point Pr and the position and shape information of the inside virtual projection surface Pi, The projection block 120 acquires the position information of each pixel as viewed from the virtual viewpoint Pv by converting the inside corresponding position to the coordinate position when viewed from the virtual viewpoint Pv. As described above, the projection block 120 defines the correspondence between the image and the inside virtual projection surface Pi.

After the process of S40, the procedure shifts to S50. In S50, the generation block 130 synthesizes the image data from the external cameras 11 based on the defined correspondence to create a composite image as viewed from the virtual viewpoint Pv. When a first piece of image data and a second piece of image data have an overlapping portion on the inside virtual projection surface Pi, the generation block 130 synthesizes the first piece of image data and the second piece of image data by setting a predetermined transmittance for the overlapping portion.

Then, in S60, the display block 140 displays the composite image on the display system 30. The display block 140 may also overlay other virtual objects on the composite image. For example, the display block 140 may overlay virtual objects representing parking frames, routes to the destination, guide lines, and obstacle positions.

Hereinafter, the composite image Ic generated according to the first embodiment described above will be explained with reference to FIGS. 5 and 6, comparing it with the reference image Ir, which is generated according to a reference example.

Figure 5:
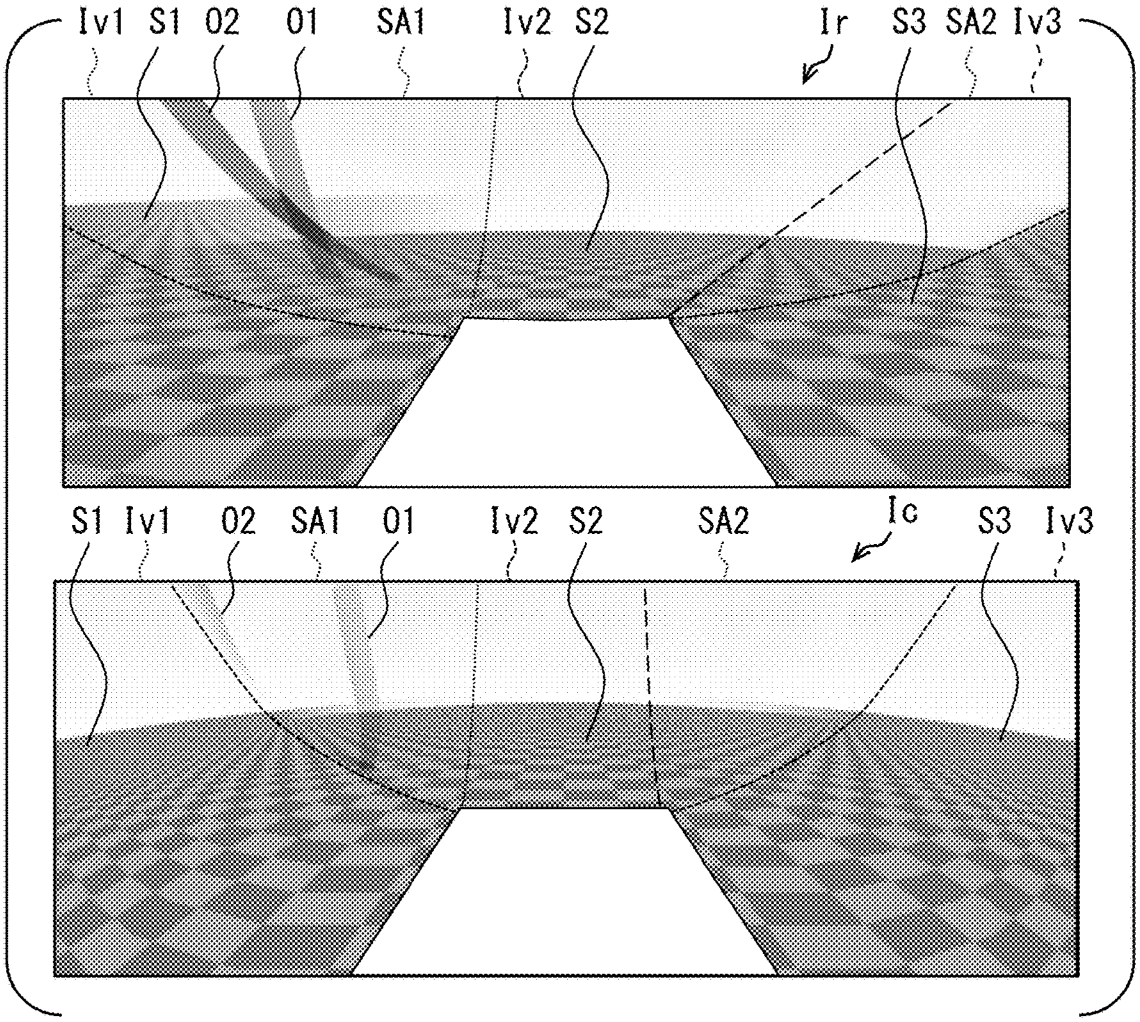
FIG. 5 is a diagram for comparing a composite image generated according to the first embodiment and a composite image generated according to a reference example.

The image on the top side of FIG. 5 shows the reference image Ir, which is generated according to the reference example. The reference image Ir is generated by projecting the images only onto the inside virtual projection surface without using the outside virtual projection surface. The image on the lower side of FIG. 5 is the composite image Ic generated according to the first embodiment.

Each image Ir, Ic is generated by synthesizing viewpoint images Iv1, Iv2, and Iv3 that are generated from images captured by the three external cameras 11 mounted on the host vehicle A. The installation positions of the three external cameras 11 are the same for the reference image Ir and the composite image Ic.

The viewpoint image Iv1 is the portion from the left edge of the reference image to the dotted line. The viewpoint image Iv1 shows an imaged ground S1 and an imaged object O1. The viewpoint image Iv2 is the portion between the dashed lines. The viewpoint image Iv2 shows an imaged ground S2 and an imaged object O2. The viewpoint image Iv3 is the portion from the long-dashed line to the right edge of the reference image. The viewpoint image Iv3 shows an imaged ground S3. The viewpoint images Iv1 and Iv2 are superimposed in a superimposed portion SA1. The viewpoint images Iv2 and Iv3 are superimposed in a superimposed portion SA2. In the example in FIG. 5, the imaged objects O1 and O2 represent an object inside the inside virtual projection surface Pi. This object is a columnar object that extends from the ground.

As shown in FIG. 5, compared to the reference image Ir, which is generated by synthesizing the viewpoint images using only the inside virtual projection surface Pi, the composite image Ic, which is generated by synthesizing the viewpoint images using both the inside virtual projection surface Pi and the outside virtual projection surface Po, has a greater degree of curvature of the imaged grounds S1, S2, and S3. In addition, in the superimposed portions SA, the degree of displacement between the imaged grounds is smaller. For example, the root portion of the imaged object O1 on the imaged ground is shifted from the root portion of the imaged object O2 on the imaged ground in the reference image Ir, while the root portions of the imaged objects O1 and O2 are nearly identical in the composite image Ic.

Figure 6:
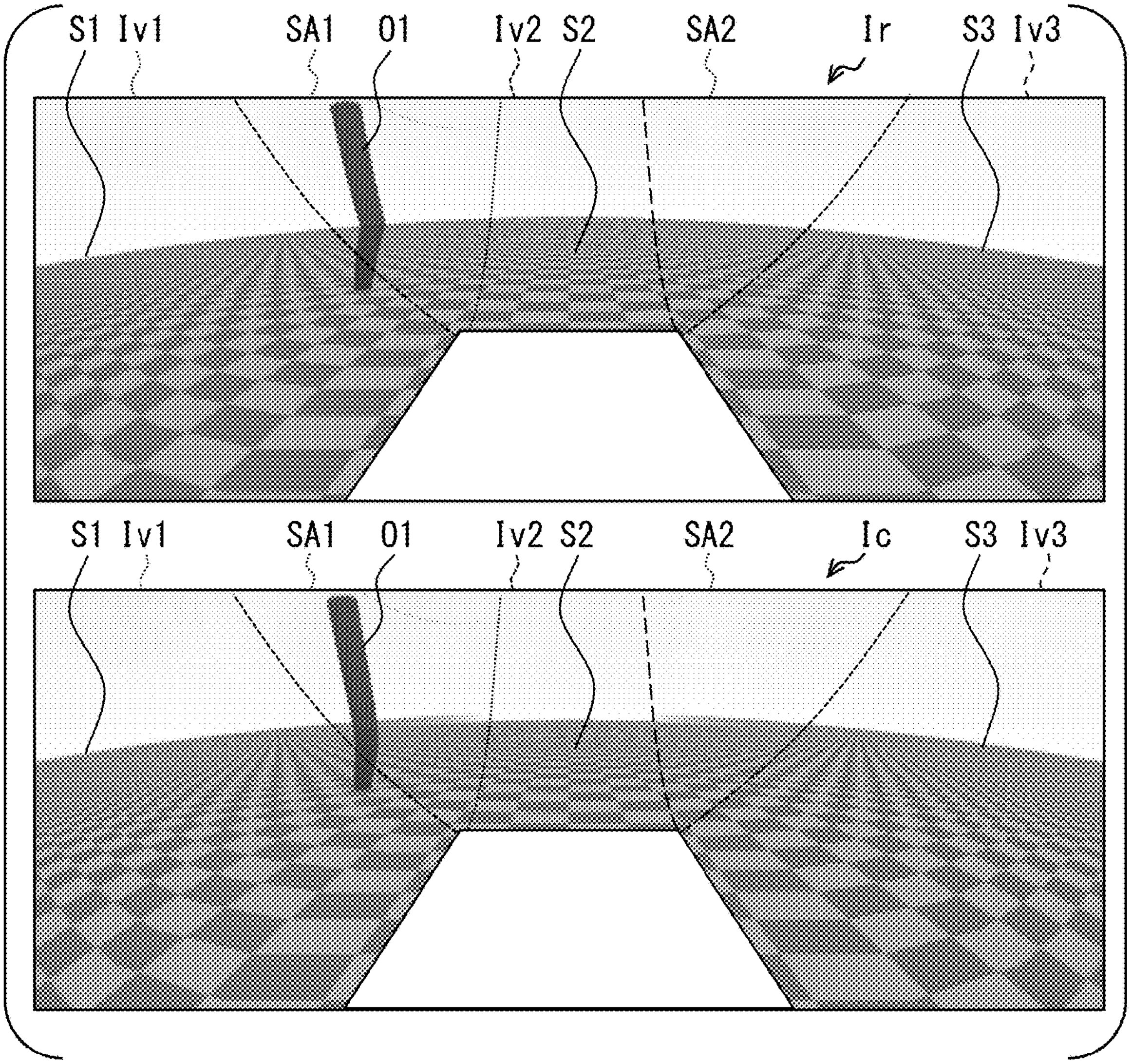
FIG. 6 is a diagram for comparing a composite image generated according to the first embodiment and a composite image generated according to a reference example.

With reference to FIG. 6, the image on the top side of FIG. 6 is the reference image Ir generated according to the reference example that projects images onto the outside virtual projection surface and the inside virtual projection surface, both of which have hemispherical shapes. The image on the bottom side of FIG. 6 is the composite image Ic generated according to the first embodiment. The external cameras 11 used for the original images of the reference image Ir and the composite image Ic are the same as those used for the original images of the reference image Ir and the composite image Ic in FIG. 5.

As shown in FIG. 6, an imaged object extending across the horizon in the reference image Ir is bent at the horizon. In contrast, the imaged object in the composite image Ic curves smoothly across the horizon. This is because the outside virtual projection surface Po in the first embodiment rises smoothly from the flat surface.

As described above, in the composite image Ic of this embodiment, the imaged ground surface curves upward to have the convex horizon, and a first position in the overlapped portion of a first viewpoint image is superimposed on a second position, which represents the same position on the actual ground surface with the first position, in the overlapped portion of a second viewpoint image. Furthermore, when at least one of the first viewpoint image and the second viewpoint image includes an object extending across the horizon, the object smoothly curves across the horizon in the composite image Ic.

Figure 7:
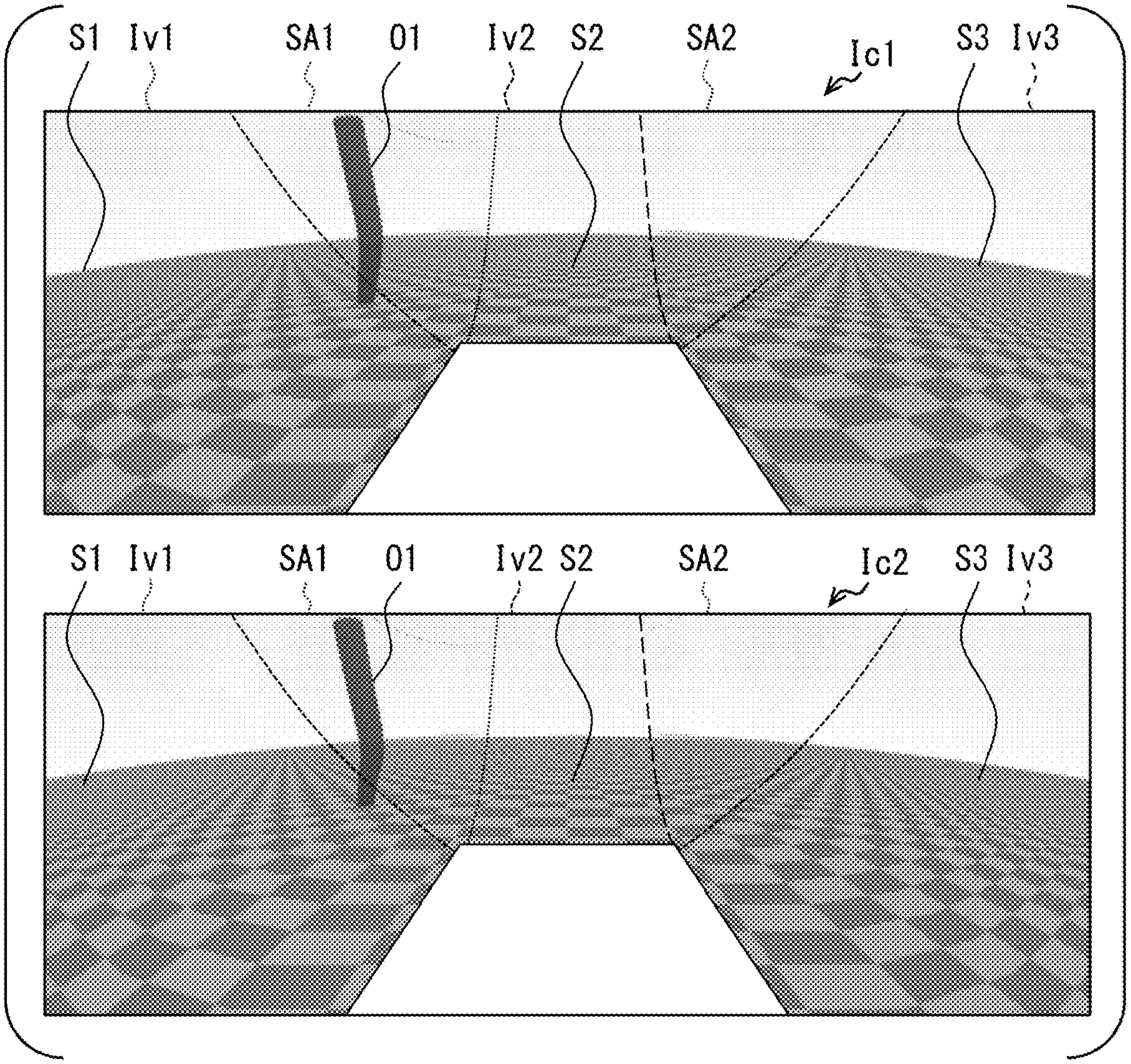
FIG. 7 is a diagram for explaining differences in composite images depending on the position of the outside virtual projection surface.

FIG. 7 shows the change in the image when the position of the outside virtual projection surface Po is changed in the first embodiment. The image on the top side of FIG. 7 is generated by setting the rising start position R at 5000 mm from the center position, and the image on the bottom side of FIG. 7 is generated by setting the rising start position R at 15,000 mm from the center position. In FIG. 7, the cross-section of the outside rising surface Po2 of the outside virtual projection surface Po is expressed by the quadratic function as y=αx^2, where the coefficient α is 10^ −6. According to FIG. 7, the farther the outside virtual projection surface Po is, the wider the field of view in the composite image Ic.

According to the first embodiment described above, by using both the outside and inside virtual projection surfaces, a composite image is generated in which the imaged ground surface curves upward, the imaged object smoothly curves across the horizon, and the imaged ground surface appears as a single entity inside the outside virtual projection surface. In other words, the projection onto the outside virtual projection surface reduces the effect of parallax between images, resulting in a unified representation of the ground surface inside the outside virtual projection surface. Additionally, the outside virtual projection surface rises smoothly, so that bending of the image can also be avoided. This means that image bending can be avoided while reducing the effects of parallax between images.

(Second Embodiment) A second embodiment is a modification of the first embodiment.

In the second embodiment, the projection block 120 changes at least one of the virtual viewpoint Pv and the rising start position R of the outside projection surface Po based on certain conditions.

For example, the projection block 120 implements change processing conditional on the moving speed of the host vehicle A. Specifically, the projection block 120 shifts the virtual viewpoint Pv upward as the speed of the host vehicle A increases. In addition, the projection block 120 shifts the rising start position of the outside projection surface away from the host vehicle A as the speed of the host vehicle A increases.

Alternatively, the projection block 120 implements change processing conditional on the location of obstacles around the host vehicle A. Specifically, the projection block 120 sets the rising start position R farther away than the location of the obstacles. For example, the projection block 120 may compare the predetermined initial rising start position R with the position of the obstacle and shift the rising start position R if the position of the obstacle is farther from the host vehicle A than the initial rising start position is. Alternatively, the projection block 120 may determine the initial rising start position R based on the position of the obstacle.

In this case, the projection block 120 maintains the virtual viewpoint Pv at a predetermined position. Alternatively, the projection block 120 may set the virtual viewpoint Pv at a position where the occupant in the host vehicle A can easily recognize the distance between the obstacle and the host vehicle A.

Alternatively, the projection block 120 implements change processing conditional on the display position of the virtual object overlaid on the composite image. Specifically, the projection block 120 sets the rising start position R farther away than the overlaid position of the virtual object that is overlaid on the ground surface of the composite image. For example, the projection block 120 may compare the overlaid position with a predetermined initial rising start position R and shift the rising start position R if the overlaid position is farther from the host vehicle A than the initial rising start position is. Alternatively, the projection block 120 may determine the initial rising start position R based on the overlaid position.

In this case, the projection block 120 maintains the virtual viewpoint Pv at a predetermined position. Alternatively, the projection block 120 may set the virtual viewpoint Pv to a position where the occupant in the host vehicle A can easily recognize the display object.

(Other embodiments) Although a plurality of embodiments have been described above, the present disclosure is not limited to these embodiments, and can be applied to various embodiments and combinations within a scope not deviating from the gist of the present disclosure.

In another modification, a dedicated computer constituting the image processing system 100 may include at least one of a digital circuit and an analog circuit, as a processor. The digital circuit is at least one of, for example, an application specific integrated circuit (ASIC), a field programmable gate array (FPGA), a system on a chip (SOC), a programmable gate array (PGA), and a complex programmable logic device (CPLD). Such a digital circuit may include a memory in which a program is stored.

In a modification example, the host mobile unit to which the image processing system 100 is applied may be, for example, an autonomous robot capable of transporting luggage or collecting information by autonomous driving or remote driving. In addition to the above-described embodiments and modifications, the present disclosure may be implemented in the form of a control device mountable on a host mobile unit and including at least one processor 102 and at least one memory 101, a processing circuit (for example, a processing ECU, etc.) or a semiconductor device (e.g., semiconductor chip, etc.)

The invention claimed is:

1. An image processing system comprising
a processor configured to cause the image processing system to perform:
acquiring a first image captured by a first external camera mounted on a host mobile body and a second image captured by a second external camera mounted on the host mobile body, an imaging range of the first image and an imaging range of the second image having an overlapped part;
converting the first image and the second image respectively into a first viewpoint image and a second viewpoint image that are viewed from a specific virtual viewpoint; and
generating a composite image by synthesizing the first viewpoint image and the second viewpoint image such that:
an imaged ground surface in the composite image curves upward to have a horizon that is convex; and
a first position on an imaged ground surface in the overlapped part of the first viewpoint image and a second position on an imaged ground surface in the overlapped part of the second viewpoint image are aligned with each other in the composite image, the first position and the second position representing the same position in an actual ground surface, wherein
the generating of the composite image includes generating the composite image including an object that has an outline curved smoothly across the horizon based on at least one of the first viewpoint image and the second viewpoint image including the object extending across the horizon.

2. The image processing system according to claim 1, wherein
the processor is further configured to cause the image processing system to perform defining:
an outside virtual projection surface onto which the first image and the second image are to be projected; and
an inside virtual projection surface onto which the first image and the second image having been projected on the outside virtual projection surface are to be further projected,
the outside virtual projection surface includes a flat surface and an outside rising surface that is smoothly curved and extends upward from the flat surface, and
the inside virtual projection surface includes an inside rising surface that extends upward and is close to the host mobile body than the outside rising surface is.

3. The image processing system according to claim 2, wherein
the processor is further configured to cause the image processing system to perform projecting:
the first image and the second image onto the outside virtual projection surface; and
the first image and the second image having been projected on the outside virtual projection surface onto the inside virtual projection surface, and
the converting of the first image and the second image respectively into the first viewpoint image and the second viewpoint image includes converting the first image and the second image having been projected on the inside virtual projection surface into the first viewpoint image and the second viewpoint image on the inside virtual projection surface that are viewed from the specific virtual viewpoint.

4. The image processing system according to claim 2, wherein
the generating of the composite image includes generating a virtual object to be overlaid on the composite image,
the defining of the outside virtual projection surface and the inside virtual projection surface includes defining a rising start position of the flat surface from which the outside rising surface extends, and
the rising start position correlates with an overlaid position in the composite image on which the virtual object is overlaid.

5. The image processing system according to claim 4, wherein
the processor is further configured to cause the image processing system to perform defining the rising start position at a position farther from the overlaid position.

6. The image processing system according to claim 2, wherein
the defining of the outside virtual projection surface and the inside virtual projection surface includes defining:
the specific virtual viewpoint that is a viewpoint from which the composite image is viewed; and
a rising start position of the flat surface from which the outside rising surface extends, and
the rising start position correlates with a position of the specific virtual viewpoint.

7. The image processing system according to claim 6, wherein
the rising start position correlates with a position of an obstacle captured in at least one of the first image or the second image.

8. The image processing system according to claim 7, wherein
the processor is further configured to cause the image processing system to perform defining the rising start position at a position farther from the host mobile body than the obstacle is.

9. The image processing system according to claim 6, wherein
the specific virtual viewpoint correlates with a moving speed of the host mobile body.

10. The image processing system according to claim 9, wherein
the processor is further configured to cause the image processing system to perform defining the specific virtual viewpoint at an upper position as the moving speed of the host mobile body increases.

11. The image processing system according to claim 10, wherein
the processor is further configured to cause the image processing system to perform defining the rising start position at a farther position as the moving speed of the host mobile body increases.

12. An image processing device comprising
a processor configured to cause the image processing device to perform:
acquiring a first image captured by a first external camera mounted on a host mobile body and a second image captured by a second external camera mounted on the host mobile body, an imaging range of the first image and an imaging range of the second image having an overlapped part;

converting the first image and the second image respectively into a first viewpoint image and a second viewpoint image that are viewed from a specific virtual viewpoint; and generating a composite image by synthesizing the first viewpoint image and the second viewpoint image such that:

an imaged ground surface in the composite image curves upward to have a horizon that is convex; and a first position on an imaged ground surface in the overlapped part of the first viewpoint image and a second position on an imaged ground surface in the overlapped part of the second viewpoint image are aligned with each other in the composite image, the first position and the second position representing the same position in an actual ground surface, wherein the generating of the composite image includes generating the composite image including an object that has an outline smoothly curved across the horizon based on at least one of the first viewpoint image and the second viewpoint image including the object extending across the horizon.

13. An image processing method executed by a processor for processing a first image captured by a first external camera and a second image captured by a second external camera, the first external camera and the second external camera being mounted on a host mobile body, the image processing method comprising:

acquiring the first image captured by the first external camera mounted on the host mobile body and the second image captured by the second external camera mounted on the host mobile body, an imaging range of the first image and an imaging range of the second image having an overlapped part;

converting the first image and the second image respectively into a first viewpoint image and a second viewpoint image that are viewed from a specific virtual viewpoint; and generating a composite image by synthesizing the first viewpoint image and the second viewpoint image such that:

an imaged ground surface in the composite image curves upward to have a horizon that is convex; and a first position on an imaged ground surface in the overlapped part of the first viewpoint image and a second position on an imaged ground surface in the overlapped part of the second viewpoint image are aligned with each other in the composite image, the first position and the second position representing the same position in an actual ground surface, wherein the generating of the composite image includes generating the composite image including an object that has an outline smoothly curved across the horizon based on at least one of the first viewpoint image and the second viewpoint image including the object extending across the horizon.

14. A non-transitory computer readable storage medium comprising an image processing program configured to, when executed by a processor, cause the processor to perform:

acquiring a first image captured by a first external camera mounted on a host mobile body and a second image captured by a second external camera mounted on the host mobile body, an imaging range of the first image and an imaging range of the second image having an overlapped part;

converting the first image and the second image respectively into a first viewpoint image and a second viewpoint image that are viewed from a specific virtual viewpoint; and generating a composite image by synthesizing the first viewpoint image and the second viewpoint image such that:

an imaged ground surface in the composite image curves upward to have a horizon that is convex; and a first position on an imaged ground surface in the overlapped part of the first viewpoint image and a second position on an imaged ground surface in the overlapped part of the second viewpoint image are aligned with each other in the composite image, the first position and the second position representing the same position in an actual ground surface, wherein the generating of the composite image includes generating the composite image including an object that has an outline smoothly curved across the horizon based on at least one of the first viewpoint image and the second viewpoint image including the object extending across the horizon.

* * * * *